INVENTOR.
MARCEL O. ALBERT

INVENTOR.
MARCEL O. ALBERT

INVENTOR.
MARCEL O. ALBERT

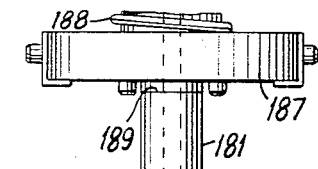

INVENTOR.
MARCEL O. ALBERT

Sept. 26, 1967  M. O. ALBERT  3,343,465
CUP-MAKING MACHINE

Filed Oct. 31, 1962  10 Sheets-Sheet 7

INVENTOR.
MARCEL O. ALBERT
BY
Brumbaugh, Free, Graves & Donohue
his ATTORNEYS.

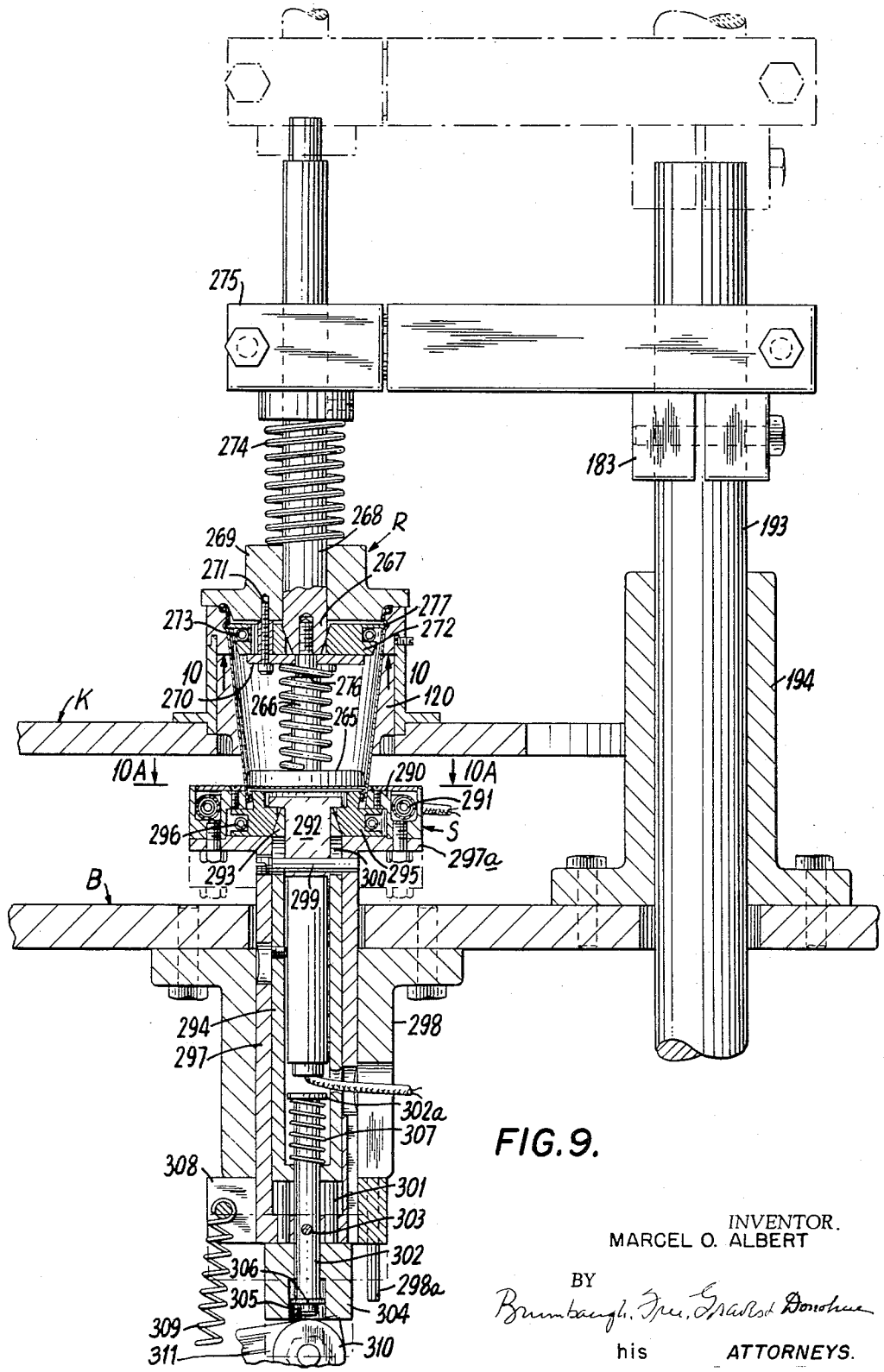

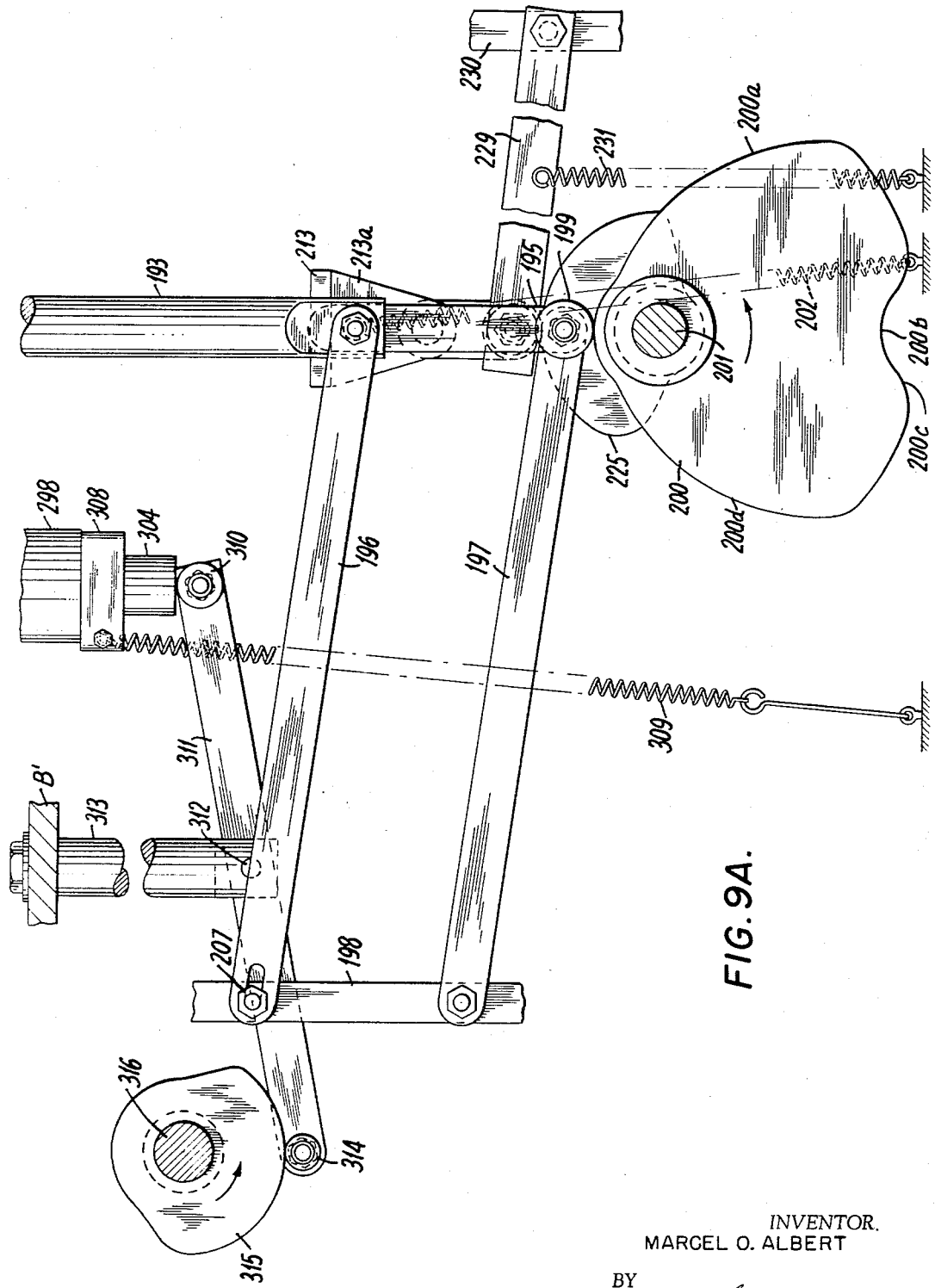

Sept. 26, 1967   M. O. ALBERT   3,343,465
CUP-MAKING MACHINE
Filed Oct. 31, 1962   10 Sheets-Sheet 10
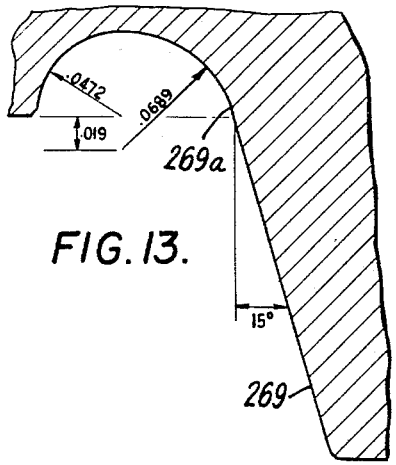
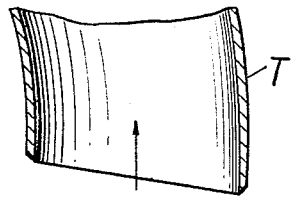
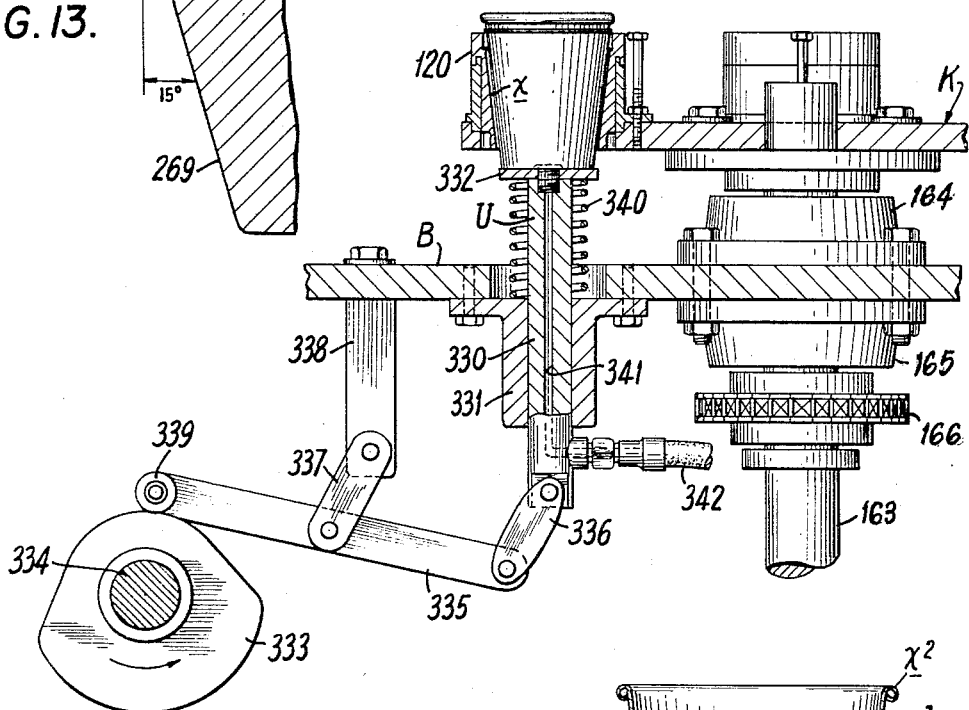
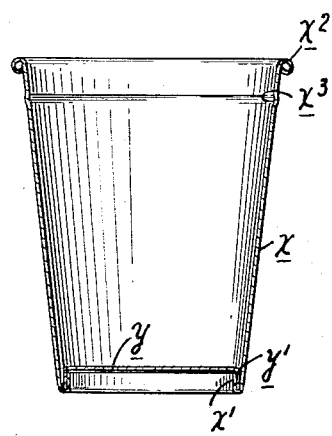
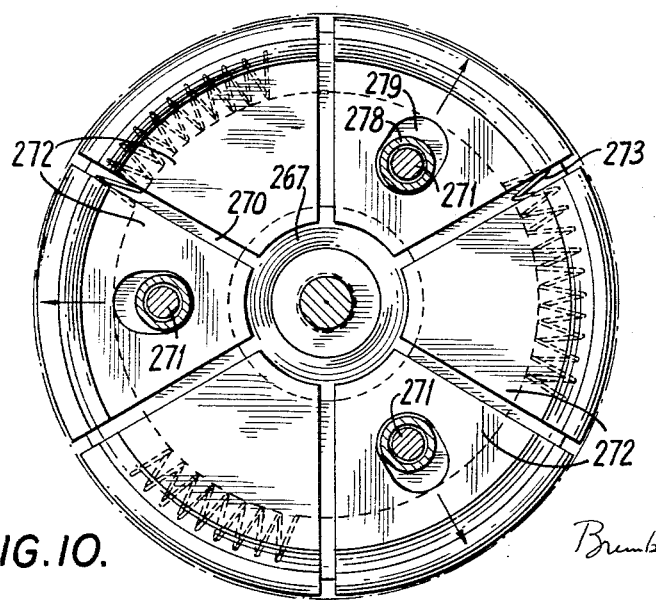
INVENTOR.
MARCEL O. ALBERT
BY
his   ATTORNEYS.

United States Patent Office  3,343,465
Patented Sept. 26, 1967

3,343,465
CUP-MAKING MACHINE
Marcel O. Albert, Falls Church, Va., assignor to Standard Packaging Corporation, New York, N.Y., a corporation of Virginia
Filed Oct. 31, 1962, Ser. No. 234,476
26 Claims. (Cl. 93—39.3)

This invention relates to a novel machine for making disposable cups.

The cup-making apparatus of the present invention provides new and improved means for handling a blank and heat-sealing it into tubular shape to form the sidewall of a cup, for forming a bottom blank and feeding it into position at the appropriate end of the tube, for handling the tube and the blank from which it is formed up to the point at which the bottom blank is inserted, for effectively sealing the bottom within the tube to form a leak-proof cup, for turning back the upper edge of the cup to form the drinking edge thereof, and for handling the cup during and subsequent to the various forming operations.

For an understanding of the present invention, reference can be made to the detailed description which follows, and to the accompanying drawings in which:

FIGURE 1 is a plan view of the cup-making machine of the present invention with certain parts shown in cross-section and certain parts broken away;

FIGURES 2, 2A and 3 are sections taken generally along the lines 2—2, 2A—2A and 3—3, respectively, of FIGURE 1;

FIGURE 5 is a bottom view showing certain components of the machine;

FIGURE 6 is a section taken generally along the line 6—6 of FIGURE 1 with the parts shown in different positions than in FIGURE 1;

FIGURES 9 and 9A are views taken generally along the lines 9—9 and 9A—9A, respectively, of FIGURE 1;

FIGURES 10 and 10A are views taken generally along the lines 10—10 and 10A—10A, respectively, of FIGURE 9;

FIGURE 11 is a view taken generally along the line 11—11 of FIGURE 1;

FIGURE 12 is a schematic vertical section of a paper cup made by the apparatus of the present invention; and FIGURE 13 is an enlarged vertical section of one of the elements of the present invention for turning back the drinking edge of the cup.

*General description*

The precut blanks $x$ from which the sidewalls of the cups are to be made are stacked in a hopper A (see FIGURES 1 and 2) supported on a frame B. These blanks are preferably paper coated with a film of polyethylene or other suitable heat sealable thermoplastic material.

Figure 2:
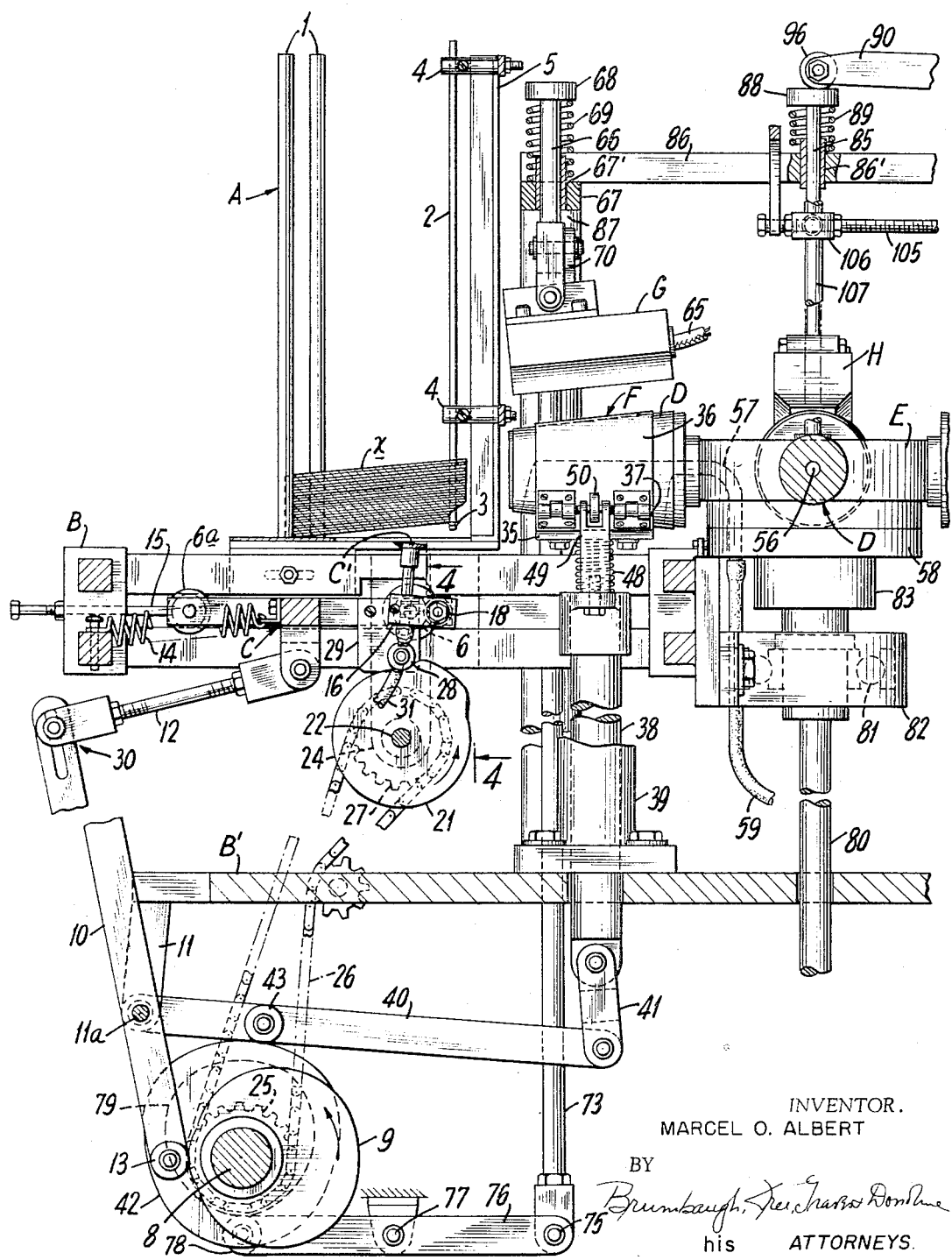

The frame B serves as a support for most of the components of the cup-making apparatus, including a reciprocating carriage C. The reciprocating carriage C, as best shown in FIGURE 2, carries a plurality of suction heads C' which feed the blanks $x$ one at a time from the hopper A to one of a plurality of frusto-conical mandrels D carried by a rotating mandrel support E. More specifically, when the carriage C is in the position shown in FIGURE 2, the suction heads C' are positioned beneath the lowermost blank stacked in the hopper, and the carriage is lifted to bring the suction heads into contact with the lowermost blank and then lowered to remove the blank from the hopper. The carriage C then travels to the right as viewed in FIGURE 2, feeding the blank to a position intermediate an articulated clamp F and the mandrel in waiting position to receive the blank. The articulated clamp F is then raised, lifting the blank off the suction heads, and the clamp operates to wrap the blank around the mandrel, bringing the edges of the blank together in overlapping relationship at the top of the mandrel. A heated sealing bar G then descends and activates the heat-sealing material to heat-seal a longitudinal seam in the tube formed from the blank.

The mandrel support E rotates about a vertical axis and carries four radially disposed mandrels spaced at 90° intervals. The mandrel is driven intermittently, each time rotating 90° to carry each mandrel through four stations designated $a$, $b$, $c$ and $d$ in FIGURE 1. Thus, following the sealing operation at the station $a$, the sealing bar G is raised and the mandrel support E rotates 90° about its vertical axis moving the mandrel on which the tube has been formed from the station $a$ to the station $b$. Meanwhile, the carriage C returns to pick up another blank from the hopper.

Figure 3:
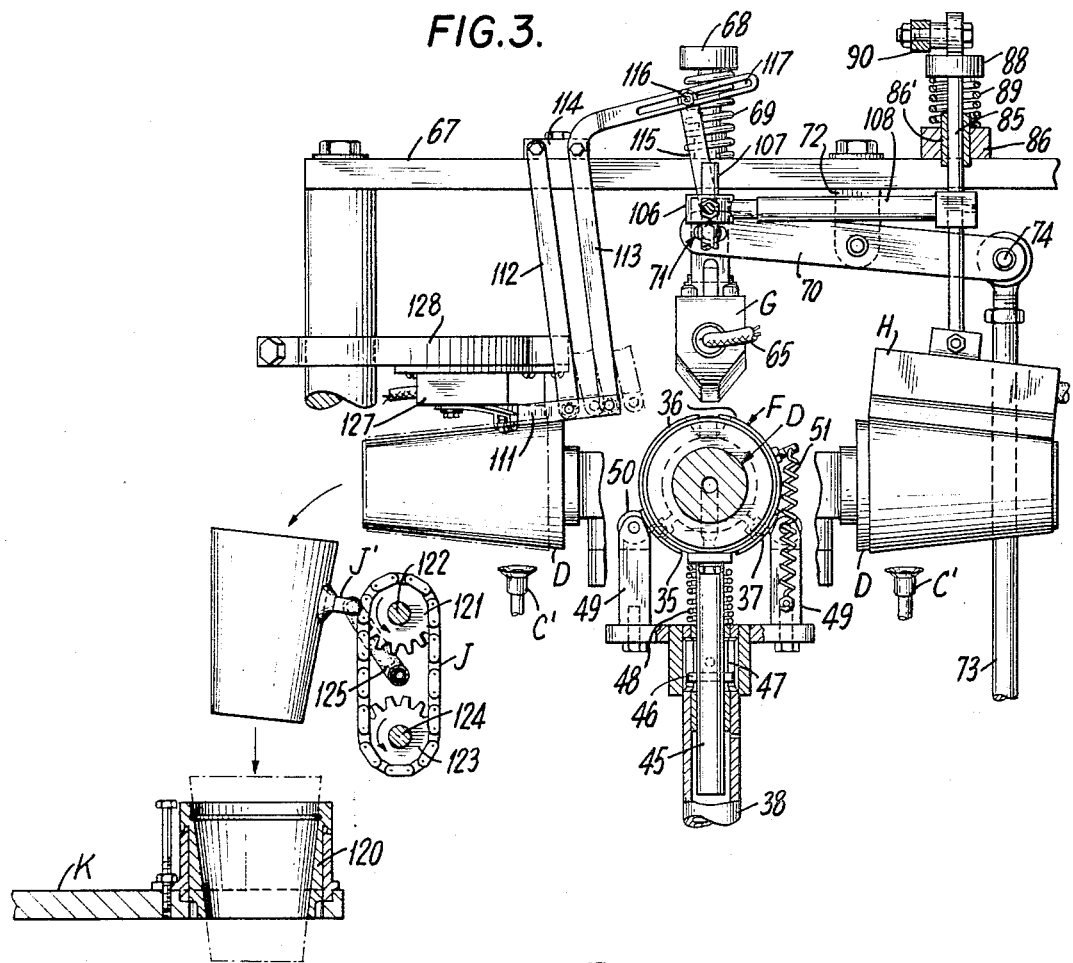

At the station $b$, as best shown in FIGURE 3, the mandrel brings the longitudinally sealed tube to a position beneath a water-cooled bar H which descends into engagement with the seam to cool it. The cooling bar H then rises, and the mandrel support E rotates 90° to bring the longitudinally sealed tube to a position beneath an inverted bottle I at the station $c$. The bottle I, best shown in FIGURE 2A, deposits a small dab of water on the inner end of the seam which ultimately will be the top edge of the paper cup. This dab of water serves to soften the paper at the seam and facilitates curling of the top edge of the cup at a subsequent stage of the operation.

The mandrel support E then rotates another quarter of a turn to bring the mandrel to the station $d$ at which the longitudinally sealed tube is removed endwise from the mandrel by a suction head J' carried by an endless conveyor J. The sealed tube is deposited by the moving suction head into a tapered bottomless receptacle of a rotating table K.

The turntable K rotates intermittently, turning 90° at a time, and carries four receptacles spaced apart 90°. Each receptacle is carried by the table through the stations designated $e$, $f$, $g$ and $h$ in sequence. At the station $e$, the tube is deposited in one of the receptacles of the turntable, as described above, and an overhead pressure-actuated pusher L descends into engagement with the upper edge of the tube to push the tube into proper position within the receptacle with the upper edge of the wider end of the tube extending above the receptacle and the lower edge of the smaller end projecting beneath the receptacle and the turntable. After the pusher L is raised out of engagement with the tube, the turntable K makes a quarter-turn to bring the tube to the station $f$. As the tube is carried from the station $e$ to the station $f$, it passes beneath a roller M which applies mineral oil lubricant to the top edge of the tube to help condition it for the action of forming tool R to be described below which turns back the upper edge of the tube to impart a rolled or curled effect to it.

At the station $f$ the tube is brought to a position beneath a vertically movable vacuum head N and above a rotatable turning tool P. As best shown in FIGURE 6, a circular bottom blank $y$ having a downwardly depending outer skirt $y^1$ (see also FIGURE 12) is delivered to the vacuum head N before the tube is carried by the turntable K to the station $f$. When the tube arrives at the station $f$ the vacuum head N descends, carrying the bottom blank $y$ into the tube through the upper end thereof and bringing it to a position near the bottom end of the tube. Meanwhile, the rotatable turning tool P moves upwardly into engagement with the bottom edge of the tube and turns upwardly the extreme lower edge of the tube to produce an upwardly turned lip $x^1$ inside the downwardly depending skirt $y^1$ of the bottom (see FIGURE 12). The rotatable turning tool P not only includes means to turn upwardly the bottom edge of the tube, but it also includes expandable means which compresses the triple ply bottom (consisting of the turned-up lip $x^2$, the skirt $y^2$ and the wall of the tube adjacent the skirt $y^2$ against the inner edge of an electrically-heated stationary ring Q which heat-seals the three layers together to produce a cup having a leakproof bottom.

After the bottom sealing operation, the vacuum head N is raised out of the tube, and the bottom turning tool P and the electrically-heated ring Q move downwardly. The suction is, of course, cut off to the vacuum head before it is lifted. The turntable K then rotates another quarter-turn to bring the cup to the station $g$ beneath a forming tool R and above a heat-sealing device S. The forming tool R (see FIGURE 9) engages and turns down the upper edge of the cup to impart it to a rounded rim $x^2$ (see FIGURE 12). The forming tool R also carries expandable means which expands within and cooperates with the upper end of the receptacle of the turntable K to form a shoulder $x^3$ which serves as a lid seat at the top of the cup. The heat-sealing device S includes an outer heated ring and an expandable inner ring which applies heat both to the inside and the outside of the triple ply bottom of the cup to insure an effective and leak-proof seal.

When the overhead forming tool R and the underneath heat-sealing device S complete their assigned tasks and move away from the cup, the turntable K carries the completed cup to a discharge station $h$ below an inverted U-shaped discharge tube T and above a vertically movable cup-discharging device U which is in communication with a source of air under pressure. As the cup-discharging device U moves upwardly into engagement with the bottom of the cup, the cup is first pushed upwardly out of the receptacle of the turntable K and then blown through the tube T. At the discharge end of the tube, the cup is deposited on a conveyor V which carries the cup to a collecting station (not shown) where the cups are stacked in nesting relationship.

*The tube forming and sealing apparatus*

Figure 1:
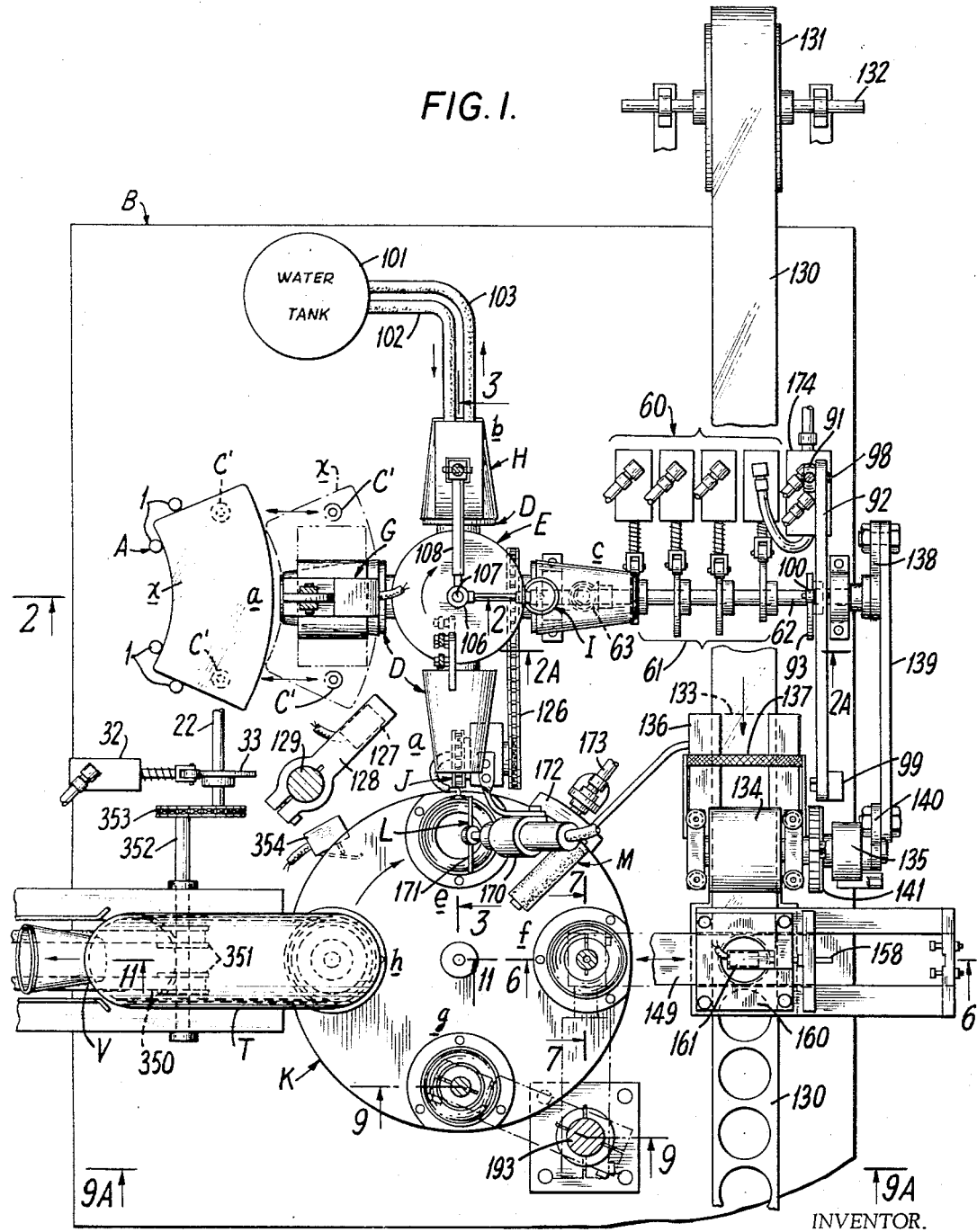

Turning now to a more detailed description of the apparatus, the blanks $x$ are precut from polyethylene coated paper before they are stacked within the hopper A. The hopper A, as best shown in FIGURES 1 and 2, is defined by a plurality of vertically extending rods 1 and 2. The rods 1 form the rear and sides of the hopper and are supported at their lower ends by the frame B of the machine. The forward edge of the lowermost blank in the stack rests against a horizontal supporting bar 3 (see FIGURE 2) supported between the two rods 2 which form the front of the hopper. The rods 2 are vertically adjustable in guides 4 which are clamped to vertically disposed brackets 5 upstanding from the main frame B.

Figure 4:
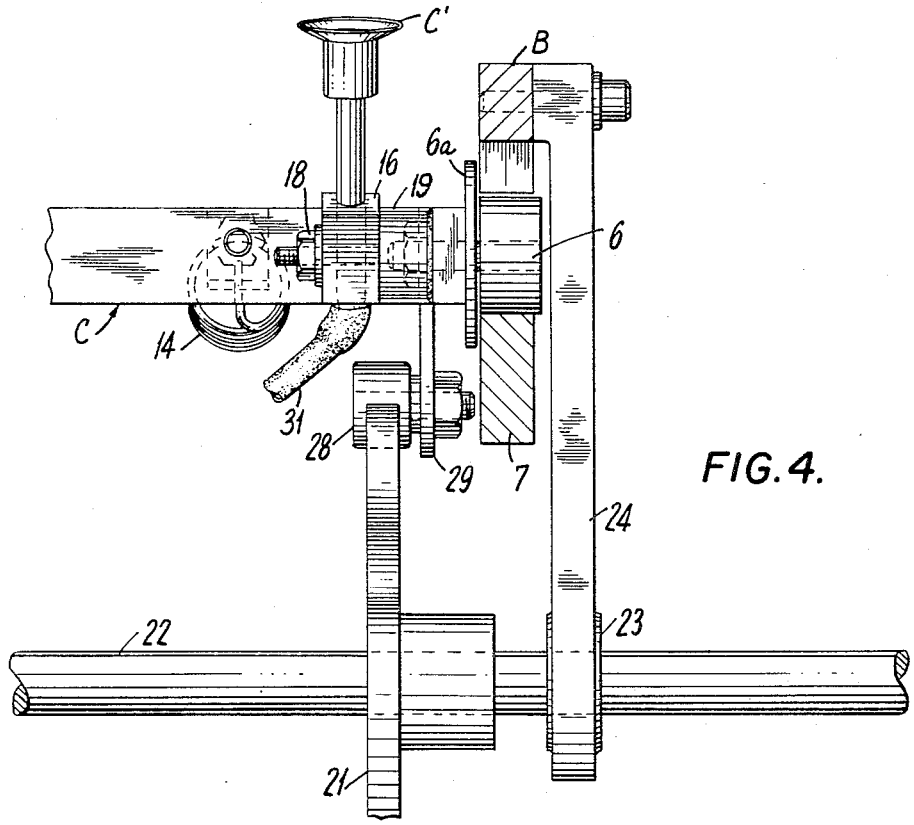
FIGURE 4 is a section taken generally along the line 4—4 of FIGURE 2.

The horizontally reciprocating carriage C beneath the hopper A is supported on a pair of parallel rails 7 (see FIGURE 4) of the main frame B. The carriage is equipped with wheels 6 which are in rolling contact with the rails. The wheels of the carriage are equipped with enlarged flanges 6a disposed inside the rails to prevent derailment of the carriage.

Reciprocating motion is imparted to the carriage C from the driven cam shaft 8 (see FIGURE 2) through a drive which includes a cam 9 fixed to the shaft 8, a lever 10 pivoted at 11a to a bracket 11 depending from a lower tier B' of the main frame, and a link 12 connecting the upper end of the lever 10 with the carriage. The lower end of the lever 10 carries a cam follower 13 which is urged toward the cam 9 by extended springs 14 which connect the frame B and the carriage. However, the extreme leftward position of the carriage, as viewed in FIGURE 2, is determined by an adjustable stop 15. As the cam 9 rotates and the high portion of the cam engages the cam follower 13, the lever pivots in a clockwise direction displacing the carriage to the right against the force exerted by the springs 14, and as the low portion of the cam engages the cam follower the carriage is returned to its initial position beneath the hopper.

The suction cups or heads C' are each carried by an adjustable arm 16 (see FIGURES 2 and 4) pivotally connected to the carriage C. The suction cup is adjustable as to height in the pivotal arm 16. Moreover, the angular orientation of the suction cup relative to the carriage can be adjusted by pivoting the arm 16 and then locking it in desired position by tightening the nut 18. A spacer 19 separates the arm 16 from the fore-and-aft side of the carriage C (see FIGURE 4).

When the carriage C is in a position beneath the hopper A, at the proper time on the machine cycle the front end of the carriage is raised to bring the suction cups C' into gripping engagement with the bottom blank in the hopper. The carriage is then lowered to pull the leading edge of the blank below the supporting bar 3 of the hopper so that it can be carried by the carriage to one of the mandrels of the mandrel-carrying rotor E.

The carriage is lifted into engagement with the bottom blank in the hopper by a pair of cams 21 (see FIGURES 2 and 4) supported on a rotatable shaft 22. The shaft 22 rotates in bearings 23 of depending brackets 24 mounted to the main frame B. The shaft 22, as shown in FIGURE 2, is driven from a sprocket 25 of the driven shaft 8 through a chain 26 which meshes with and drives a sprocket 27 affixed to the shaft 22. As the shaft 22 rotates, the raised portions of the cams 21 engage cam followers 28 carried by plates 29 depending from the carriage, thereby lifting the leading end of the carriage and bringing the suction cups C' carried by the carriage into engagement with the bottom blank of the stack in the hopper. The low portions of the cams 21 then lower the leading ends of the carriage, pulling the blank gripped by the suction cups from the hopper. The lost motion pin and slot connection 30 between the lever 10 and the link 12 afford the necessary freedom of movement to permit the elevation and lowering of the carriage.

A conduit 31 connects each of the suction cups C' with a vacuum source through a valve 32 (see FIGURE 1) actuated by a control cam 33 on the shaft 22. The suction cups are in communication with the vacuum source from the time when the suction cups first engage the blank to be removed from the hopper to the time that the blank is transferred to one of the mandrels D carried by the rotor E.

The blank is carried by the suction cups C' of the carriage to a position below the mandrel D at the station $a$ and above the articulated clamp F. The articulated clamp F, as best shown in FIGURES 2 and 3, includes an intermediate bottom segment 35 and pivotal segments 36 connected to the bottom segment by hinges 37. The articulated clamp is carried at the upper end of a rod 38 (see FIGURE 2) guided for vertical movement in a sleeve 39 bolted to the lower tier B' of the main frame. The rod 38 is displaced upwardly and downwardly at the proper times in the machine cycle by a cam-actuated lever 40 which is pivotally connected at one end to the bracket 11 and connected at the other end to the lower end of the rod 38 by a link 41. Pivotal motion is imparted to the lever 40 by a cam 42 affixed to the shaft 8 through a cam follower 43 carried by the lever intermediate its ends.

As best shown in FIGURE 3, the bottom segment 35 of the articulated clamp F is carried by a short rod 45 which is in telescoping relationship with the upper end of the rod 38. The rod 45 carries a cross-pin 46 which is accommodated within a slot 47 at the upper end of the rod 38, and the rod 45 is urged upwardly by a compressed spring 48 acting between the rods 38 and 45 to a position determined by the engagement of the cross-pin 46 with the upper end of the slot 47. The upper end of the rod 38 also carries a pair of upstanding members 49, each of which carries a roller 50 which engages one of the hinged segments 36 of the articulated clamp. The segments 36 of the articulated clamp are normally urged to their open positions by extended springs 51 (only one of which is shown) which connect each of the hinged segments 36 to its respective support member 49. Thus, in the lowermost position of the articulated clamp, the intermediate segment 35 is urged upwardly on the rod 38 by the spring 48, pivoting the segments 36 to spread-apart open positions. When a blank is delivered by the carriage C to a position above the open clamp, the rod 38 is raised at the proper time during the machine cycle, lifting the blank from the suction cups of the carriage toward the overhead mandrel D. During this upward travel of the articulated clamp, the intermediate segment 35 brings the blank into engagement with the bottom of the mandrel which stops the further upward travel of the intermediate segment 35 of the clamp. However, the continued upward movement of the rod 38 telescopes the rod 45 into the upper end of the rod 38, thereby compressing the spring 48, and the relative movement between the upstanding supporting members 49 and the intermediate segment 35 pivots the hinged segments 36 of the articulated clamp toward the mandrel, wrapping the blank around the mandrel and bringing the edges of the blank into overlapping relationship at the top in position to be sealed into the shape of a tube by the overhead sealing bar G.

As best shown in FIGURE 5, each of the mandrels D has a longitudinal recess 55 formed in the bottom which is in communication with a vacuum source through a manifold 56. More specifically, the rotor E, as best shown in FIGURE 2, is supported on a stationary bearing plate 58. The rotor E carries a conduit 57 which communicates with the manifold 56 and terminates in an opening at the bottom of the rotor just above the bearing plate 58. A conduit 59 extends upwardly through the bearing plate 58 and terminates in an opening which communicates with the conduit 57 associated with the mandrel at the station $a$ in position to receive a blank from the articulated clamp. The conduit 59, in turn, communicates with the vacuum source through one of the battery of valves, generally designated 60 in FIGURE 1. The valves 60 are each controlled by timing cams, generally designated 61, which are affixed to a shaft 62 supported above the top of the main frame and driven from the main drive of the machine (not shown) through a drive transmission, generally designated by the numeral 63.

After the blank $x$ has been wrapped around the mandrel and the edges are brought together in overlapping relationship at the top, the sealing bar G descends into engagement with the overlapping portions of the tube and heat seals a longitudinal seam in the tube. The sealing bar G is electrically heated from an external supply of electric power through a cable 65. The sealing bar, as best shown in FIGURE 2, is supported at the lower bifurcated end of a rod 66 which is guided for vertical movement in a guide sleeve 67' of an overhead support 67 mounted above the main frame of the machine by posts 87. The upper end of the rod 66 has an enlarged head 68, and a compressed spring 69 is interposed between the top of the overhead support 67 and the enlarged head. The compression spring 69 urges the sealing bar upwardly to an inoperative position spaced above the mandrel D at the station $a$. The supporting rod 66, however, is capable of being actuated downwardly against the force exerted by the spring 69 by a more or less horizontally disposed link 70 (see FIGURE 3) connected to the rod 66 through a lost motion slot and pin connection generally designated 71. The lever 70 is pivotally supported intermediate its ends from a depending bracket 72 of the overhead support 67. The lever 70 is actuated through a vertically disposed link 73 pivotally connected at 74 to the end of the lever 70 opposite the pin and slot connection. As best shown in FIGURE 2, the lower end of the link 73 is pivotally connected at 75 to a cam-actuated lever 76. The cam-actuated lever is pivoted on a shaft 77 intermediate its ends, and at the end opposite the pivotal connection 75 it carries a cam follower 78 which engages a cam 79 mounted on the driven shaft 8. The spring 69, as explained above, maintains the sealing bar G in raised position until the raised portion of the cam 79 pivots the lever 76, raising the link 73 and pivoting the lever 70 so as to lower the sealing bar against the force exerted by the compressed spring 69. The sealing bar comes into engagement with the overlapped portion of the blank, and after the sealing operation it is restored to its raised, inoperative position.

As mentioned above, the mandrel-carrying rotor E is supported for rotation on a stationary bearing place 58 and driven intermittently each time through a quarter turn to carry each mandrel through the stations $b$, $c$, $d$ and then back to station $a$. The mandrel is driven through a vertically disposed drive shaft 80 (see FIGURE 2) which rotates in bearings 81 mounted within the bearing housing 82 and within bearings mounted within a bearing housing 83. The lower end of the drive shaft is driven through a conventional Geneva drive (not shown) which serves as the indexing means for the rotor E.

At the station $b$, as explained above, the mandrel carries the sealed tube to a position beneath the water-cooled bar H which cools the heated seam. The cooling bar H, as best shown in FIGURE 2, is supported from a vertically disposed rod 85 which is guided for vertical movement in a guide sleeve 86' of an overhead support 86 mounted above the main frame of the machine by posts 87. The upper end of the rod 85 has an enlarged head 88 and the rod accommodates a compressed spring 89 which is interposed between the top of the overhead support 86 and the enlarged head. The compression spring 89 urges the cooling bar H upwardly to an inoperative position spaced above the mandrel at the station $b$. The supporting rod 85, however, is capable of being actuated downwardly against the force exerted by the spring 89 through an actuating mechanism which includes a horizontally disposed lever 90 (see FIGURES 2, 2A and 3), a vertically disposed link 91 pivoted to one end of the lever 90 and a lever 92 (see FIGURE 1) which is pivotally actuated by a cam 93 carried by the driven shaft 62. The lever 90 is supported on a pivot 94 to an upstanding bracket 95. The free end of the lever 90 carries a roller 96 which engages the top of the head 88 of the rod 85. The opposite end of the lever 90 is pivotally connected by a pin 97 to the upper end of the link 91. The lower end of the link 91 is pivotally connected by a pin 98 (see FIGURE 1) to the end of the lever 92 which is pivoted at its opposite end to a bracket 99 connected to the main frame of the machine. The lever 92 carries a cam follower 100 intermediate the ends thereof which cam follower engages the cam 93. As the cam rotates, the high portion thereof pivots the lever 92 upwardly raising the link 91 and pivoting the lever 90 to bring the roller 96 into depressing engagement with the rod 85, thereby bringing the cooling bar H into engagement with the seam. When the cam follower 100 comes into engagement with the low portion of the cam 93, the spring 89 pushes the rod 85 upwardly, lifting the cooling bar H to its raised, inoperative position.

As best shown in FIGURE 1, cooling water is pumped continuously from a water tank 101 to the cooling bar H through a tube 102 and then back to the water tank through a tube 103.

The rotor E then carries the sealed tube through another quarter turn to the station *c* where a water-filled bottle I descends into engagement with the inner end of the seal (corresponding to the top edge of the cup) to deposit a dab of water on the seal to soften the paper and condition it for a subsequent rolling-back operation. The water bottle I is carried by a bracket 104 (see FIGURE 2A) which is connected through a horizontal threaded rod 105 to a sleeve 106 (see FIGURES 2 and 3) in sliding engagement with an upstanding vertical rod 107 extending upwardly from the axis of the rotor E. As shown in FIGURE 3, the sliding sleeve 106 is connected by a rod 108 (which extends at right angles to the threaded rod 105) to the rod 85 which supports the cooling bar H. Thus, the water bottle I and the cooling bar H are connected by the right angle linkage described above so that they move in unison.

The inverted bottle I contains a normally closed spring-pressed valve which prevents leakage of the water from the bottle when the bottle is in its raised, inoperative position. When the bottle is lowered, an absorbent dauber 110 engages the seal of the tube and opens the valve, permitting the water to keep the dauber moistened. The inverted bottle is then raised to inoperative position, and the rotor E makes a quarter turn to carry the sealed tube from the station *c* to the station *d*.

At the station *d* the tube is loosened from the mandrel by a kicker foot 111 (see FIGURE 3). The kicker foot is supported at the lower end of a parallelogram linkage comprising a pivotal link 112 and a pivotal bell crank lever 113, both of which are pivotally connected to a block 114 atop the overhead support 67. The lower arm of the lever 113 extends parallel to the link 112, and the opposite arm extends toward the axis of the rotor E and is connected by a link 115 to the sleeve 106 which moves vertically on the post 107. The lower end of the link 115 is pivotally connected to the sleeve, and the upper end carries a pin 116 which engages a slot 117 in the pivotal lever 113. Thus, when the sleeve 106 moves downwardly on the post 107 to bring the inverted bottle I into engagement with the sealed tube at the station *c*, the kicker foot 111 is actuated to engage and partially displace the tube at the station *d* from the supporting mandrel.

The tube thus loosened from the mandrel is carried by a suction cup J′ to a receptacle 120 of the turntable K. The suction cup J′, as shown in FIGURE 3, is carried in an orbital path by the chain J which passes around an upper sprocket 121 on a shaft 122 and a lower sprocket 123 on a shaft 124. The suction cup communicates with a vacuum source through the conduit 125 and one of the control valves 60. As best shown in FIGURE 1, the shaft 122 is driven from the drive transmission 63 by a chain 126.

When the sealed tube is removed from the mandrel at the station *d* the rotor E again makes a quarter turn to bring the mandrel back to the station *a* and the cycle is repeated. In moving from the station *d* to the station *a*, the mandrel passes under a microswitch 127 mounted beneath a member 128 supported from the main frame of the machine by a post 129 (see FIGURE 1). If, by chance, the sealed tube has not been removed from the mandrel, its presence is detected by the microswitch 127 and the machine is shut off so that the tube can be removed by the operator before it receives another blank from the articulated clamp F.

Bottom blank punching and feeding apparatus

The turntable K carries the tube from the station *e* to the station *f* where the bottom of the cup is inserted. The stock 130 (see FIGURE 1) from which the bottom blanks are punched is supplied in web form from a roll 131 supported on a shaft 132 (see FIGURE 1). The stock is preferably paper coated with a film of polyethylene or other suitable heat-sealable, thermoplastic material.

The web is supported and guided between the roll and a table 133 by one or more rollers (not shown). The web is advanced along the table 133 by a feed roller 134 intermittently driven through a one-way clutch 135 and a gear train 141. The web is guided to the feed roll 134 between and under a pair of overhead side guides 136. The feed roller 134 is resiliently supported so that it is spring-urged into frictional contact with the web. The support, however, is equipped with a handle 137 which permits the feed roller 134 to be lifted manually out of frictional engagement with the web to interrupt the feed of the web momentarily. One-way motion is imparted to the clutch 135 by a crank arm 138 affixed to the end of the shaft 62, a link 139 connected to the arm 138 through a lost motion connection (not shown) and an oscillating arm 140 connected to the input element of the clutch. The rotation of the crank arm 138 imparts reciprocating motion to the link 139 which, in turn, oscillates the crank arm 130. The rotation is imparted to the feed roll 134 by the movement of the arm 140 in one direction, but not in the opposite direction.

On the downstream side of the feed roll 134, the table 133 contains an opening 142 (see FIGURE 6) for the passage of a punch 143 therethrough. The punch is guided for vertical movement in an upstanding sleeve 144 which is bolted to the main frame B of the machine. Reciprocating motion is imparted to the punch 143 by an eccentric 145 through a link 147 which is adjustable as to length in order to permit the stroke of the punch to be controlled. The eccentric 145 comprises an outer ring 145*a*, a center hub portion 145*b* and bearings 145*c* interposed therebetween. The axis of the center hub 145*b* is connected by a shaft 149 to a cam 151 eccentrically of the axis of the shaft 146 which supports the cam. The cam 151 is affixed to the shaft so that as the cam rotates, the eccentric is carried in an orbital path which, in turn, imparts reciprocating motion to the link 147.

The punch 143 cooperates with a die 148 spaced above the web 130 from which the bottoms *y* of the cups are punched. A slide 149 having a hole 150 at one end thereof is supported for movement transverse to the direction of feed of the web 130. Reciprocating motion is imparted to the slide 149 by an actuating mechanism which includes the cam 151 on the shaft 146, a bellcrank lever 152, a supporting pivot shaft 153 for the bellcrank lever and a link 154 pivotally connected at one end to the upper end of the bellcrank lever 152 and at the other end to a depending projection 155 of the slide. The downwardly extending arm of the bellcrank lever 152 carries a cam follower 156 which, when engaged by the high portion of the cam 151, pivots the bellcrank lever 152 against the action of a spring 157 to displace the slide 149 to the right, as viewed in FIGURE 6. When the slide is in its extreme position to the right, the hole 150 is disposed above and in alignment with the die 148, so that the punch can push the bottom blank *y* into the hole in the slide. When the slide has received the bottom blank, it moves to the left under the influence of the spring 157 as the cam follower 156 comes into engagement with the low portion of the cam 151. The extreme position of the slide to the left, as viewed in FIGURE 6, is determined by the engagement of the set screw 158 with a member 160 which forms part of the guideway for the slide.

The bottom blank *y* is formed by the cooperation of the punch 143 and the die 148. As the punch is raised toward the die, it lifts the web 130 upwardly and pushes part of the web into the die. The upper end of the punch being of smaller diameter than the part below the shoulder 143*a* produces the downwardly depending skirt *y*′ before the cooperation between the shoulder 143*a* and the lower end of the die separates the blank from the web. As the punch continues its upward travel through the die, it introduces the bottom blank *y* into the opening 150 of the slide 149. The punch then descends through the die and the web and is restored to a position below web 130 which can now be advanced another increment by the feed roll 134. Meanwhile the slide 149 moves to the left, as viewed in FIGURE 6, to a position where the bottom blank y is beneath the vacuum head N which comes down into engagement with the upper surface of the bottom blank, grips it by suction and lifts it from the hole 159 of the slide before the slide returns to its position in alignment with the die to receive the next bottom blank.

A microswitch 161 is supported by the member 160 in a position directly above the slide. The actuating arm 162 of the microswitch engages the moving slide 149, so that it can detect whether the slide has received a bottom blank from the punch and die and also whether the bottom blank has been removed from the slide by the vacuum end head N. Since this safety feature is merely ancillary to the cup-making apparatus of the present invention, it is not described in more detail herein.

*Bottom inserting and initial bottom sealing apparatus*

The tube which has been formed from the longitudinally sealed blank x and delivered to the receptacle 120 of the turntable K at the station e is carried by the turntable to the station f at which station the bottom is inserted within the tube, the lower edge of the tube is turned upwardly and the bottom is initially sealed within the lower end of the tube. The turntable K, as best shown in FIGURE 11, is supported atop a vertical shaft 163 which, in turn, is supported for rotation by bearings accommodated within the housings 164 and 165 bolted to the top and bottom, respectively, of the main frame B. The shaft 163 is driven through a chain and sprocket drive 166 by the same drive which imparts intermittent quarter turn motion to the mandrel supporting rotor E.

While it is still at the station e the tapered tube is pushed snugly into the tapered open-bottom receptacle 120 by an overhead pressure actuated pusher L which descends into engagement with the upper edge of the tube. As best shown in FIGURE 1, the overhead pusher comprises a cylinder 170, which is supported by a bracket at the station e and a cross bar 171 connected to the lower end of the movable piston rod of the piston (not shown) housed within the cylinder. The cross bar 171 descends into engagement with the upper edge of the tube and pushes it into proper position within the receptacle 120 so that the upper end of the tube is exposed above the turntable K and the lower end of the tube is exposed beneath the turntable.

As the turntable carries the tube from the station e to the station f, the receptacle passes a mouthpiece 172 (see FIGURE 1) in sliding engagement with the outer perimeter of the table. The mouthpiece 172 communicates with a vacuum source through a conduit 173 and a pressure actuated valve 174 controlled by one of the control valves 60. The outer end of the turntable K is provided with a passage which communicates with the receptacle 120. Normally when the receptacle contains a tube, suction is pulled against the tube indicating that the machine is operating properly. However, in the event that a tube has not been delivered to a particular receptacle of the turntable, the mouthpiece, instead of drawing suction against the outer surface of the tube, is in communication with atmospheric pressure through the empty receptacle, thereby detecting the absence of a tube within the receptacle and translating the information to a means which shuts down the operation of the machine to permit one to be inserted by the operator. Since this safety feature is not part of the cup-forming apparatus of the present invention, it is unnecessary to go into a more detailed description herein.

As the tube is carried from the station e to the station f, it passes beneath roller M which applies mineral oil lubricant to the top edge of the tube to condition it for the forming tool at the station g which turns back the upper edge of the tube and imparts a roll or curl effect to it.

Figure 7:
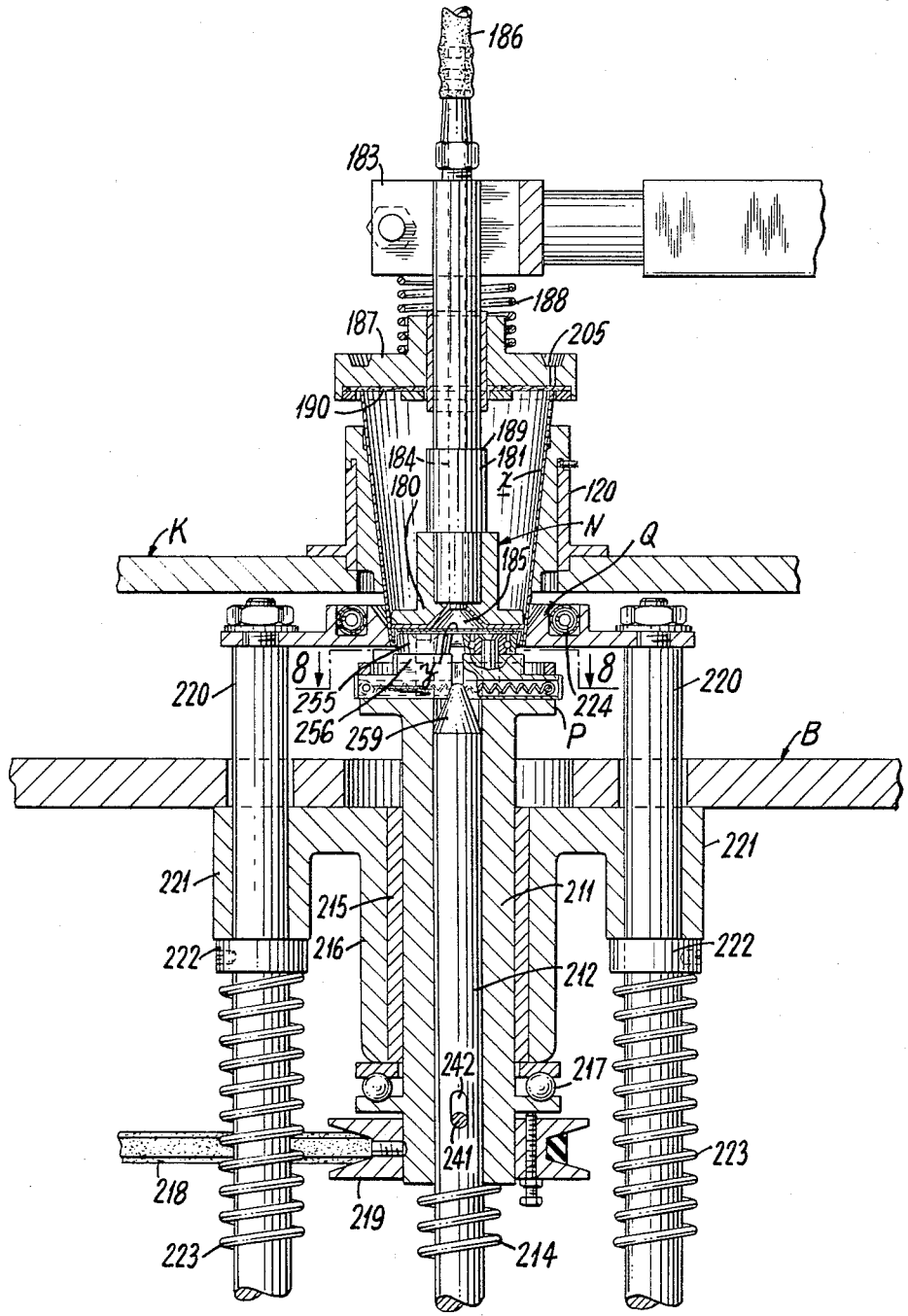
FIGURES 7 and 7A are the upper and lower portions, respectively, of a section taken generally along the line 7—7 of FIGURE 1.

At the station f the turntable is brought to a stop and the tube is positioned beneath an overhead vacuum head N and above the bottom turning apparatus P and the sealing ring Q. As best shown in FIGURES 6 and 7, the vacuum head N comprises a suction head 180 carried at the lower end of a vertically disposed tube 181 depending from an overhead support 183. The tube has a passage 184 extending axially therethrough which communicates at one end with a recess 185 formed in the lower surface in the head and at its upper end with a conduit 186 which is in communication with a vacuum source through the valve 174. The portion of the tube 181 directly beneath the support 183 carries a cover-like element 187 in sliding engagement thereon. A compressed spring 188 is interposed between the support 183 and the sliding element 187 pushing the sliding element toward a supporting shoulder 189 of the tube 181. The bottom of the sliding cover 187 carries a felt lining 190 which is adapted to engage the upper edge of the tube while the suction head 180 carries the cup bottom y through the tube and places it in the proper position at the bottom thereof. The cover 187 insures that the tube is properly oriented and pressed all the way into the tapered receptacle, and the felt absorbs any excess moisture or lubricant on the upper edge of the cup.

The support 183 for the vacuum head is affixed to a vertically movable rod 193 (see FIGURES 1, 9 and 9A) which, as shown in FIGURE 9, is guided within an upstanding sleeve 194 bolted to the main frame B of the machine. The lower end of the vertically movable rod 193 is pivotally connected to the upper end of a link 195. The link 195 is supported in upright position by a pair of parallel links 196 and 197 (see FIGURE 9A) which are pivotally connected to a vertical supporting member 198 of the main frame B of the machine. The lower end of the link 195 carries a cam follower 199 which engages the outer surface of a cam 200 affixed to the driven cam shaft 201. An extended spring 202 connects the lower end of the rod 193 with the base of the machine so as to keep the cam follower 199 in engagement with the surface of the cam 200. As the cam rotates, the surface 200a raises the vacuum head N to a position above the path of travel of the slide 149 (see FIGURE 6) before the slide delivers a bottom blank y to a position beneath the vacuum head. The recess 200b lowers the vacuum head into engagement with the bottom blank carried by the slide, and the surface 200c raises the vacuum head, permitting the vacuum head to lift the bottom blank from the slide before the slide moves from under the vacuum head in its return to receive another cup bottom. The surface 200d then lowers the vacuum head into the upper end of the tube at the station f bringing the bottom blank to the desired position at the lower end of the tube. Since during the vertical reciprocation of the rod 193 by the cam 200 the lower end of the link 195 oscillates somewhat as a result of its pivotal connection with the link 197, the upper link 196 is connected to the support 198 by a lost motion pin and slot connection 207.

During the descent of the vacuum head into the tube and before the vacuum head completes its full downward stroke, the cover element 187 comes into gentle engagement with the upper edge of the tube at a position determined by the engagement of the cover with upstanding screws 210 adjustably connected at their lower ends in the top of the turntable K. The felt lining of the cover element 187 removes any excess oil applied by the roller M, and the cover element insures that the tube is held in position within the receptacle 120 of the turntable by the force exerted by the compressed spring 188; otherwise, the bottom turning mechanism P might displace the tube from the receptacle 120. Since the cover element 187 engages the upper end of the tube before the vacuum head N completes its downward stroke, it contains holes 205 therein to prevent a vacuum from building up within the tube while the vacuum head is completing its downward stroke.

The bottom turning and initial sealing means at the station *f* is most easily explained in connection with FIGURES 7 and 7A of the drawings. The rotatable turning tool P is housed in the upper end of a tubular rotor 211 which is resiliently supported on a rod 212 by a spring 214 also accommodated on the rod 212 and interposed between the top of a supporting bracket 213 and the bottom of the tubular rotor. The rotor 211 is accommodated both for rotation and axial motion within a bearing 215 of a downwardly depending sleeve 216 affixed to the main frame B of the machine. The rotor also carries a thrust bearing 217 which, in the uppermost position of the rotor, engages the bottom of the sleeve 216. Rotation is imparted to the rotor 211 by a motor (not shown) through a belt 218 and a pulley 219 affixed to the rotor beneath bearing 217. The limited vertical movement of the rotor does not interfere with the drive transmission which imparts rotation to the rotor.

The heated ring Q is supported on a pair of vertically movable rods 220 which are guided for vertical movement within downwardly depending sleeves 221 which are formed integrally with the depending sleeve 216 described above. The vertically movable rods 220 each carry a spring retaining head 222 locked on the respective rod by a screw, and the rods 220 are normally urged upwardly by compressed springs 223 accommodated on the rods and interposed between the heads 222 and the supporting bracket 213.

The heating ring Q contains an electrically heated coil 224 which, when the heating ring is in its uppermost operative position, surrounds the lower end of the cup. After the sealing operation, the sealing ring is lowered away from the cup so that the cup can be carried by the turntable K from the station *f* to the station *g* and a new tube delivered to the station *f*. This vertical movement is imparted to the heating ring Q by a cam 225 affixed to the driven shaft 201. Toward this end, the bracket 213, as best shown in FIGURE 7A, carries two downwardly depending members 213a which support a pin 226 between them. The pin 226 serves as a support for a sleeve 227 which is pivoted thereon. The sleeve 227, in turn, has a depending arm 227a which carries a rotatable cam follower 228 in position to engage the outer surface of the cam 225. As best shown in FIGURE 9A, the lower end of the arm 227a is pivotally connected to a link 229 which, in turn, is pivotally connected at its opposite end to a stationary member 230 of the main frame of the machine. A spring 231 connects the arm 229 with the base of the machine to keep the cam follower 228 in engagement with the cam 225. As the high portion of the cam 225 comes into engagement with the cam follower, upward movement is imparted to the bracket 213 lifting the vertically disposed rods 220 until the ring Q snugly surrounds the lower end of the tube to which the bottom is to be heat sealed. Upward displacement of the cup within the receptacle 120 is prevented by the cover element 187 described above.

Figure 7A:
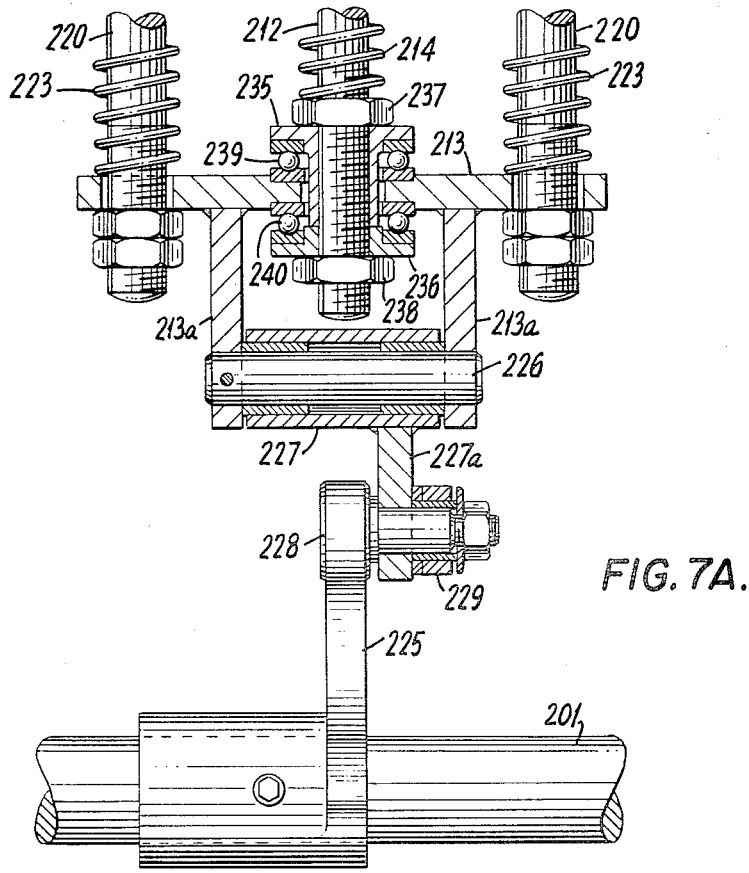

As best shown in FIGURE 7A, the lower end of the rod 212 carries a two-piece bearing retainer which includes an upper sleeve-like bearing retaining element 235 and a lower sleeve-like bearing retaining element 236 held together by nuts 237 and 238 threaded on the lower end of the rod 212. The bearing retainers accommodate between them an upper bearing 239 between the element 235 and the bracket 213 and a lower bearing 240 between the element 236 and the bottom of the bracket 213. These bearings permit the rod 212 to rotate with the rotor 211, the two being connected by a cross-pin (see FIGURE 7) 241 carried by the rotor 211 which passes through a slot 242 in the rod. Thus, although rotation is imparted to both through the motor-driven belt 218, limited relative movement between the rotor 211 and the rod 212 is permitted by means of this pin-and-slot connection.

Before the turntable K delivers a sealed tube to the station *f*, the turning tool P is in its lowermost position out of the path of the lower end of the tube. As the cam follower 228 comes into engagement with the raised portion of the cam 225 upward movement is imparted to the bracket 213, as described above, raising the rod 212. During the upward movement of the bracket 213 upward movement is also imparted to the rotor 211 through the spring 214. The upward position of the rotor 211 is determined by the engagement of the upper face of the bearing 217 with the lower end of the sleeve 216, but the pin-and-slot connection between the rotor 211 and the rod 212 permits the rod to continue its upward travel to actuate the forming tool P in a manner which will be described below.

Figure 8:
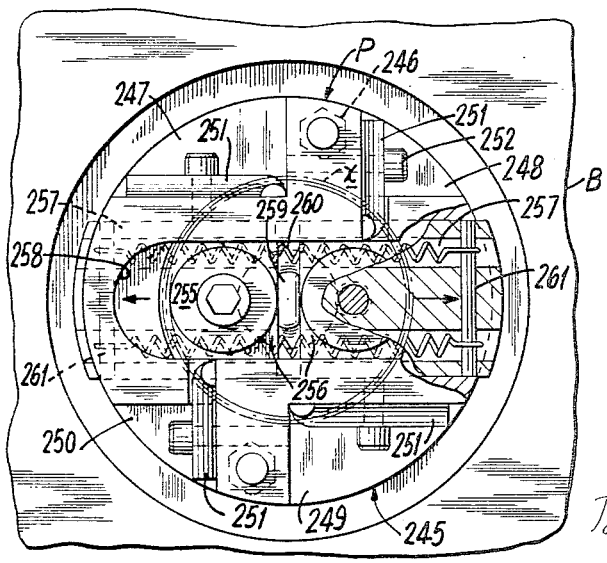
FIGURE 8 is a view taken generally along the line 8—8 of FIGURE 7.
Figure 8A:
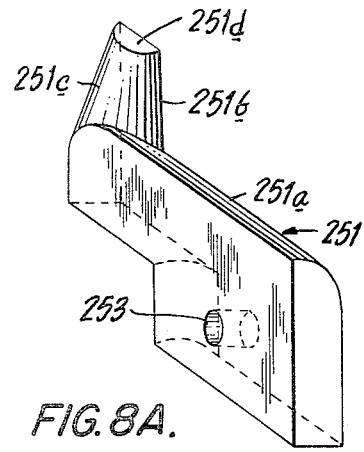
FIGURE 8A is an enlarged perspective view of one of the parts shown in FIGURE 8.

The turning tool P, as best shown in FIGURE 8, comprises a housing 245 which is held by bolts 246 to the upper end of the rotor 211. The top surface of the housing 245 includes four recessed portions 247, 248, 249 and 250, each bounded by two upstanding walls at right angles. Each of the recessed portions of the housing accommodates a bottom turning tool 251 of the type shown in FIGURE 8A. The bottom turning tool accommodated within the recesses 248 and 250 are somewhat shorter in length than those accommodated within the recesses 247 and 249; however, they all operate in the same manner. The bottom turning tools 251 are each affixed to one of the walls which define the respective recess by means of a screw 252 which passes through a hole 253 of the forming tool.

The bottom turning tools 251 each include an upper convex surface 251a, an upstanding formation 251b at the inner end thereof and having a convex surface 251c on one side thereof. The tools 251 are each mounted so that the upstanding projection 251b is disposed inside the bottom of the tube (shown in phantom lines in FIGURE 8) while the horizontally disposed convex surface 251a extends outwardly beneath the edge of the tube forming an acute angle with the outer surface of the tube. The rotor 211 is driven in a direction such that the horizontally disposed convexly curved leading surface 251a engages the bottom edge of the tube, turning it upwardly inside the downwardly projecting skirt y' of the cup bottom y which is held in proper position by the vacuum head N. As the lower edge of the tube is turned upwardly to form an upturned lip $x^1$ (see FIGURE 12), it engages the convex surface 251c of the upstanding projection 251 which guides it to a position adjacent and inside the skirt y' of the bottom blank y. The upper end 251d of the projection 251b is flattened to prevent it from coming into contact with the bottom blank y held in position by the vacuum head N.

The turned-up lip $x^1$ of the tube is then urged outwardly by a pair of wheels or rollers 255 which press against the inside of the lip $x^2$ sandwiching the lip $x^1$, the skirt y' and the outer wall of the cup against the heating ring Q to heat seal them together as a unit and to form a rigid base for the cup. The wheels 255 are each carried by a slide 256 accommodated in guideways 257 of the housing 245 with the wheels projecting upwardly through a slot 258. The slides 256 are normally urged toward each other and into engagement with opposite sides of a wedge 259 by a pair of springs 260 connected between rods 261 carried by the slides. The wedge 259 is formed at the upper end of the rod 212. When the apparatus P is raised to its operative position and the upwardly turned lip $x^1$ has been formed by the bottom turning tools 251, the wedge 259 moves upwardly to spread apart the slides and bring the wheels 255 into pressure engagement with the turned-up lips $x^2$. Toward this end, as best shown in FIGURE 7, the outer perimeters of the wheels 255 are slightly tapered in complementary fashion to the taper of the bottom of the cup.

After the bottom sealing operation, the vacuum head N is raised out of the cup and the forming device P and the heating ring Q are lowered, all as described above, and the turntable K carries the cup from the station $f$ to the station $g$ and brings the next sealed tube to the station $f$.

*Top forming and final bottom sealing apparatus*

At the station $g$, as explained above, the top forming apparatus R (see FIGURE 9) comes into engagement with the upper edge of the cup to form the rounded upper rim $x^2$ (see FIGURE 12) and part thereof expands outwardly within the receptacle 120 of the rotating table K to form the shoulder $x^3$ which serves as a lid seat at the top of the cup. The top forming apparatus R carries a plunger 265 which is connected by a cylindrical stem 266 to the bottom of a wedge 267 formed at the end of a rod 268. The rod 268 carries a head 269 in sliding engagement thereon above the wedge formation 267. A plate 270 is spaced apart beneath the head 269 but connected thereto by screws 271. The space between the head 269 and the plate 270 accommodates a plurality of sector-shaped elements 272 encircled by a spring 273 which urges the inner surfaces of all of the sector elements into engagement with the wedge formation 267. The outer surfaces of the sector elements are recessed to accommodate the spring therein. As best shown in FIGURE 10, separator tubes 278 are interposed between the bottom surface of the head 269 and the plate 270, and the screws 271 pass through the separator tubes. The separator tubes also help keep alternate of the sector elements 272 in place. These sector elements have oversized radially extending slots which permit them to be displaced outwardly by the wedge 267 against the action of the spring 273 which urges them inwardly into a compact cluster.

The plate 270 is in sliding engagement with the upper end of the cylindrical stem 266, and a spring 274 interposed between an overhead support 275 and the sliding head 269 normally displaces the entire assembly to a position determined by the engagement of the bottom of the plate 270 with a shoulder 276 formed on the cylindrical stem 266. A compressed spring on the stem 266 and interposed between the plunger 265 and the plate 270 reduces the impact between the plate 270 and the shoulder 276. The overhead support 275 is connected to the same vertically movable rod 193 which carries the support 183 for the vacuum head N.

As the assembly R descends into operative relationship with the upper edge of the cup, the upper edge of the cup is engaged by a smooth, concave-forming surface 269a (see FIGURE 13) of the head 269 which rolls or curls the upper end of the cup to form the rounded lip $x^2$, and the plunger 265 is brought to a position above the cup bottom. The surface 269 is preferably a surface coated with a film of "Teflon," the trademark of a plastic consisting of tetrafluoroethylene polymer; alternatively, it can be a mirror polished chrome surface. The downward travel of the head 269 is determined by the engagement of the head with the top of the receptacle 120. However, after the head 269 seats on the receptacle 120, the continued movement of the rod 268 brings the wedge formation 267 at the lower end thereof into spreading engagement with the sectors 273, spreading them outwardly and forcing the upper protruding outer edges 277 into engagement with an annular groove formed within the receptacle 120, thereby forming the lid-supporting shoulder or seat $x^3$, as shown in FIGURE 12.

Figure 10A:
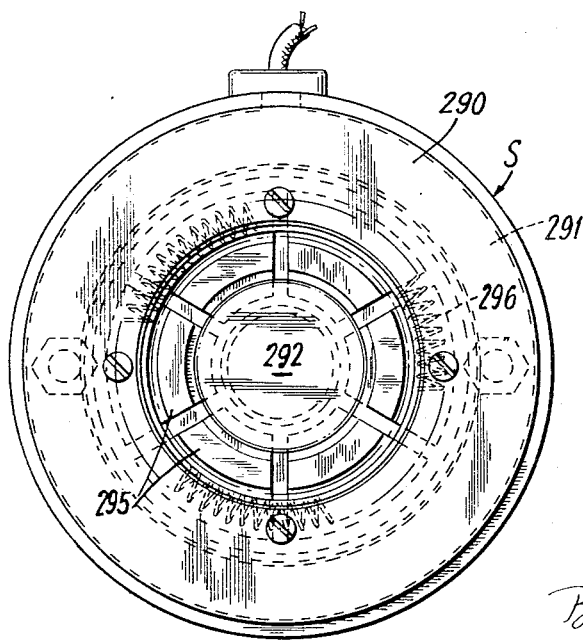

The heating apparatus S beneath the cup at the station $g$ comprises, as best shown in FIGURES 9 and 10A, an outer heating ring 290 heated by an electric coil 291, an electrically heated inner element 292, a wedge 293 formed at the upper end of a vertically movable sleeve 294 and a plurality of heating sector-shaped elements 295 surrounded by a spring 296 recessed in the outer peripheries of the sector-shaped elements. The heating ring 290 is supported on an upper flange 297a of a sleeve 297 accommodated for vertical movement within the downwardly depending guides 298 of the main frame B. The flange 297a, the ring 290 and the central heating element 292 cooperate to form a housing for the sector-shaped elements 295.

The sleeve 297 carries a cross-pin 299 which passes through an elongated slot 300 of the wedge sleeve 294 permitting relative movement between the two elements so that the wedge can operate to expand the sector elements outwardly at the appropriate time in the machine cycle. The lower end of the wedge sleeve 294 carries a plurality of depending prongs 301 which are in sliding engagement with holes at the lower end of the sleeve 297. A rod 302 is in sliding engagement with the bottom of the wedge 294, but the rod is affixed by a pin 303 to the lower end of the sleeve 297. A block 304 is held by a screw 305 and washer 306 to the bottom of the rod 302. The upper end of the rod 302 carries a spring 307 between the bottom of the wedge 294 and a head 302a at the extreme upper end of the rod, which pushes the wedge 294 downwardly relative to the sleeve 297, causing the prongs to project below the bottom of the sleeve 294 and separate the block 304 from the bottom of the sleeve 297. A collar 308 is affixed to the extreme lower end of the sleeve 297, and depending prongs 298a of the tubular guide 298 pass through holes formed in the collar 308 so as to guide the collar when it moves with the sleeve 297 relative to the guide 298. The sleeve 297 is urged downwardly by an extended spring 309 connecting the collar 308 and the base of the machine to keep the block 304 in engagement with a roller 310 carried by a pivotal lever 311. The pivotal lever 311, as shown in FIGURE 9A, is supported on a pivot shaft 312 of a bifurcated post 313 depending from the lower tier B′ of the main frame of the machine. The opposite end of the lever 311 carries a cam follower 314 which engages a cam 315 affixed to a driven shaft 316.

The sealing apparatus S is in its lower inoperative position until a cup is delivered by the turntable K to the station $g$ of the machine. When the cam follower engages the high portion of the cam 315, the lever 311 is pivoted to bring the roller 310 into engagement with the block 304, raising the sleeve 297 until the collar 308 comes into engagement with the lower end of the depending tubular guide 298. In this position the outer heating ring 290 is in contact with and encircles the outer lower edge of the cup, and the sector-shaped elements 295 are spaced apart from the up-turned internal lip $x^1$ of the cup because the wedge 294 has not yet been driven relative to the sleeve 297. However, the continued pivotal movement of the lever 311 drives the block 304 upwardly on the rod 302, thereby driving the wedge 294 upwardly through the engagement of the block with the prongs 301. The wedge expands the heating sectors 295, bringing them into sealing engagement with the upturned lip $x^1$ of the cup and pressing the triple-ply bottom of the cup outwardly against the heated ring 290, thereby applying heat to both the inside and outside of the cup bottom to insure effective sealing of the bottom of the cup. The continued rotation of the cam 315 brings the cam follower into engagement with the lower portion of the cam, thereby lowering the entire sealing assembly S to inoperative position and completing the function of the station $g$.

*Cup-discharging apparatus*

With the forming apparatus in its raised inoperative position and the sealing assembly S in its lowermost inoperative position, the turntable, at the appropriate time in the machine cycle, carries the completed cup from the station $g$ to the station $h$ at which the cup is discharged from the receptacle 120 of the turntable through an inverted U-shaped tube T by a cup-discharging apparatus U. As best shown in FIGURE 11, the cup-discharging device U comprises a vertically movable pusher 330 guided for movement in a depending sleeve 331 bolted to the bottom of the main frame B of the machine. The upper end of the tube 330 carries a plate 332 which engages the bottom of the cup during the upward travel of the tube and pushes it from the receptacle 120. The pusher 330 and the plate 332 are provided with a passage 341 which communicates with a source of high pressure through a tube 342 and a control valve (not shown), so that when the cup has been lifted from the receptacle 120 of the turntable, air pressure through the passage 341 is directed against the bottom of the cup to blow it through the tube onto the conveyor V (see FIGURE 1).

The desired upward motion is imparted to the pusher 330 by a compressed spring 340 interposed between the plate 332 and the sleeve 331. The pusher is lowered against the force of the spring 340 by a cam 333 mounted on a driven shaft 334 through a linkage which includes a lever 335 and parallel links 336 and 337. The lever 335 is pivotally supported midway between its ends from the link 337 which, in turn, is pivoted to a depending member 338 affixed to the main frame B of the machine. The link 336 connects one end of the lever 335 with the bottom of the pusher 330. The opposite end of the lever 335 carries a cam follower 339 which the spring 340 keeps in engagement with the cam 333. When the high part of the cam 333 engages the cam follower, the lever 335 is pivoted pulling the pusher 330 downwardly against the action of the spring 340.

The cup which has been loosened from the receptacle in the manner described above is blown by a blast of air through the tube T onto the conveyor V (see FIGURE 1) which carries it to a collection station where the cups are stacked in nesting relationship. The conveyor V, as shown in FIGURE 1, comprises a plurality of belts 350 which are driven by pulleys 351 on the shaft 352 which is connected with the shaft 22 by a chain and sprocket drive transmission generally designated 353.

The turntable K returns the empty receptacle 120 back again at the station e to receive the next sealed tube to be carried through the stations e, f, g and h, as described above. As the receptacle 120 is carried from the station h to the station e, it passes over a microswitch 354 (see FIGURE 1) which checks whether the cup has been discharged from the receptacle. If it detects a cup, the switch functions through an electrical circuit to automatically shut down the machine, so that the cup can be removed by the operator.

*Conclusion*

The novel apparatus of the present invention constitutes a simple, compact machine for rapidly making cups of good quality at high speed.

The invention, although shown in a single preferred form and by way of example only, can be greatly modified within the spirit of the invention. The invention, therefore, is not to be limited to any specified form or embodiment, except insofar as such limitations are set forth in the appended claims.

I claim:

1. A cup-making apparatus comprising a rotor supported for rotation about a vertical axis, at least one mandrel carried by said rotor and extending radially from said rotor, means for imparting rotation to said rotor to carry the mandrel through a plurality of stations, means feeding a blank to a mandrel at one station, means at a station for wrapping said blank around said mandrel, means at a station for heat sealing said blank in tubular form, means at a station for removing the sealed tube from the mandrel, said mandrel and the tube formed thereon being tapered and including a turntable in proximity to the path of travel of said mandrel, at least one receptacle carried by said turntable, means for imparting rotation to said turntable to carry the receptacle through a plurality of stations, means for transferring the sealed tube from the mandrel to the receptacle, said receptacle being tapered so as to support the tube with the upper and lower ends of the tube exposed, means for delivering a bottom to the tube within the receptacle at one station, said bottom having a downwardly depending outer skirt, a heated ring movable into an operative position surrounding the lower edge of the tube, and a rotatable tool movable into position within the lower end of the tube, said rotatable means including means for turning up the lower edge of the tube inside the depending skirt of the cup bottom and means urging the turned-up edge outwardly toward the heated ring.

2. A cup-making apparatus as set forth in claim 1 including means for engaging the upper end of the cup to hold it within the receptacle during the edge-turning and heat-sealing operation.

3. A cup-making apparatus as set forth in claim 1 including non-rotational means at one station engageable with the upper edge of the tube within the receptacle, said means having a highly smooth concave annular formation to roll back the upper edge of the cup.

4. A cup-making apparatus as set forth in claim 3 in which said smooth surface is coated with a film of tetrafluoroethylene polymer.

5. A cup-making apparatus as set forth in claim 1 including an outer heat-sealing ring movable into operative position with the bottom of the cup at one station, an inner expandable heat-sealing assembly movable into operative position at the same station and means for expanding said inner heat-sealing assembly against the inner side of the lower end of the cup urging it toward said outer heat-sealing ring.

6. A cup-making apparatus as set forth in claim 1 including a discharge tube at one station and means for directing a stream of fluid against the bottom of the cup to blow it through said tube.

7. A cup-making apparatus as set forth in claim 6 including means engageable with the bottom of the cup to dislodge it from the receptacle to insure that it will be discharged from the receptacle by said stream of fluid.

8. A cup-making apparatus comprising a rotor, a plurality of mandrels carried by said rotor through a plurality of stations, the axes of the mandrels extending outwardly from the rotor, a cooling element for cooling the seal at one station, an element for depositing a fluid on said sealed tube at another station, a rod upstanding from the axis of said rotor, a sliding support on said rod, means connecting the cooling element and said bottle to said sliding support, said sliding support, cooling element and bottle forming a connected assembly, and means for imparting vertical movement to the connected assembly to move in unison the cooling element and the bottle toward and away from the mandrels at their respective stations.

9. A cup-making apparatus as set forth in claim 8 including a kicker foot at another station and actuating means connecting the kicker foot and the said connected assembly.

10. A cup-making apparatus comprising a turntable, a tapered receptacle carried by said turntable through a plurality of stations, means for delivering a tapered tube to a receptacle at one station, the tubes being carried by the receptacle with the upper and lower ends protruding therefrom, means for delivering a tube bottom through the upper end of the tube to a position near the lower end, said bottom having a depending outer skirt, means engageable with the upper end of the tube to hold it within the receptacle, a rotor movable into operative position with the bottom of the tube and an element carried by the rotor having an upper surface for bending the lower edge of the tube inwardly of the tube and an upstanding surface within the tube for guiding it upwardly inside the depending outer skirt of the cup bottom.

11. A cup-making apparatus as set forth in claim 10 in which the bending side of said upper surface is sloped and in which the outer upstanding guiding surface is convexly curved.

12. A cup-making apparatus as set forth in claim 10 including means carried by said rotor movable from an inner inoperative position to an outer position in engagement with said turned-up bottom edge of the tube to urge it outwardly against the depending outer skirt of the cup bottom.

13. A cup-making apparatus as set forth in claim 12 including heat-sealing means around the outer surface of said tube, whereby said outwardly movable means urges the turned-up inner edge of the tube and the outer depending skirt of the cup bottom toward said heat-sealing means.

14. A bottom-turning tool for making a cup characterized in that it includes an upper shaped deflecting edge for deflecting an edge of a tube to be made into a cup and an upstanding projection integrally connected with said deflecting edge and having a guiding surface engageable with said deflected edge of the tube.

15. A bottom-turning tool as set forth in claim 14 in which the guiding surface is convexly curved.

16. A bottom-turning tool as set forth in claim 14 in which the guiding surface is rounded.

17. In a cup-making apparatus in which a cup bottom having a depending outer skirt is positioned within a tube near the lower end thereof, bottom-forming apparatus comprising a rotor, at least one bottom-turning tool carried by said rotor, said tool having an upper sloped surface which in the operative position of the rotor engages the bottom of the tube at an acute angle, said tool including an upstanding portion which in the operative position of the rotor extends upwardly inside the tube, said upstanding portion having an outer curved surface, and means carried by the rotor which is movable from a position near the axis to a position further away from the axis.

18. A bottom-forming apparatus as set forth in claim 17 in which said outwardly movable means includes a rotatable wheel.

19. A bottom forming apparatus as set forth in claim 17 including a wedge-shaped actuator for imparting movement to said outwardly movable means.

20. A bottom-forming apparatus as set forth in claim 17 in which said outwardly movable means includes a pair of slides spring-urged to inoperative positions and including a wedge movable between said slides to displace them outwardly.

21. A cup-making apparatus comprising means for supporting a tube which is to form the sidewall of the cup with the bottom freely disposed, means for supporting a cup bottom within and at the lower end of the tube, said cup bottom having a depending outer skirt, a sealing ring movable into operative position surrounding the lower end of said tube, a rotor movable into operative position beneath the tube, a plurality of bottom-turning elements carried by said rotor, said bottom-turning element having an upper turning edge which engages the lower edge of the tube and forms an acute angle with the outer surface of the tube and a guide which projects upwardly from said turning edge inside the lower end of the tube to guide the turned edge upwardly inside the depending skirt of the cut bottom, and movable means carried by the rotor and movable into engagement with the turned-up edge to urge the skirt of the cup bottom outwardly against the sealing ring.

22. A cup-making apparatus as set forth in claim 21 in which said movable means carried by the rotor includes a pair of slides accommodated in guides of the rotor, wheels carried by the slides, and actuating means for moving said slides outwardly to bring the wheels carried thereby into rolling contact with the turned-up bottom edge of the tube.

23. A cup-making apparatus as set forth in claim 22 in which said actuating means is a wedge movable between said slides to move the slides outwardly and including spring means to urge the slides inwardly.

24. In a cup-making apparatus in which a cup-bottom having a downwardly depending skirt is heat-sealed to the lower end of a tube having a turned-up lower edge, means for heat-sealing said depending skirt between the lower end of said tube and said turned-up lower edge comprising an outer heat-sealing ring movable into operative position surrounding the lower end of the cup, a support for said outer heat-sealing ring, a plurality of heat-sealing sector elements carried by said support, resilient means for urging said sector elements inwardly and a centrally located wedge for moving said sector elements outwardly into sealing engagement with the turned-up lower edge of said tube.

25. A cup-making apparatus as set forth in claim 24 in which said wedge is formed at one end of a rod which is accommodated within said support.

26. A cup-making apparatus as set forth in claim 25 including means for spring-biasing said rod relative to the support and common actuating means for moving said support to bring the outer sealing ring and said heat-sealing sector elements into operative positions and then for moving said sector elements to expand them outwardly toward said outer heat-sealing ring.

References Cited
UNITED STATES PATENTS

| | | | |
|---|---|---|---|
| 1,962,983 | 6/1934 | Cooley | 93—39.3 |
| 1,987,362 | 1/1935 | Cooley | 93—39.3 |
| 2,135,219 | 11/1938 | Reifsnyder | 93—39.3 |
| 2,216,331 | 10/1940 | Swallow et al. | 93—39.3 |
| 2,720,246 | 10/1955 | Piazze. | |
| 2,725,001 | 11/1955 | O'Neil | 93—39.2 |
| 2,819,659 | 1/1958 | Scott et al. | 93—39.3 |
| 2,819,658 | 1/1958 | Scott et al. | 93—36.5 |
| 2,834,260 | 5/1958 | DeWiess | 93—39.1 |
| 2,942,530 | 6/1960 | Bodendoerfer | 93—39.3 |
| 3,049,979 | 8/1962 | Sayford | 93—39.3 |
| 3,063,347 | 11/1962 | Cummings | 93—39.3 |
| 3,065,677 | 11/1962 | Loeser | 93—36.5 |
| 3,170,581 | 2/1965 | Temple | 214—209 |
| 3,181,860 | 5/1965 | Liebenow et al. | 271—32 |

BERNARD STICKNEY, Primary Examiner.